United States Patent [19]

Kimura et al.

[11] 4,401,332

[45] Aug. 30, 1983

[54] BUMPER CONSTRUCTION FOR AUTOMOTIVE VEHICLES

[75] Inventors: Toshimitsu Kimura, Fujisawa; Yutaka Ohmura, Zushi, both of Japan

[73] Assignee: Nissan Motor Co., Ltd., Yokohama, Japan

[21] Appl. No.: 226,954

[22] Filed: Jan. 21, 1981

[30] Foreign Application Priority Data

Jan. 31, 1980 [JP] Japan .................................. 55-9290

[51] Int. Cl.³ .............................................. B60R 19/06
[52] U.S. Cl. .................................. 293/135; 293/136
[58] Field of Search ............... 293/102, 120, 131, 133, 293/132, 135, 136, 137, 148, 155

[56] References Cited

U.S. PATENT DOCUMENTS

| | | | |
|---|---|---|---|
| 1,348,962 | 8/1920 | Sager | 293/135 |
| 1,542,240 | 6/1925 | Harris | 293/135 |
| 1,957,515 | 5/1934 | Williams | 293/135 |
| 3,540,768 | 11/1970 | Peters | 293/135 |
| 3,927,907 | 12/1975 | Bialek | 293/135 |
| 4,252,355 | 2/1981 | Goupy et al. | 293/132 |
| 4,278,282 | 7/1981 | Roubinet et al. | 293/135 |

FOREIGN PATENT DOCUMENTS

| | | |
|---|---|---|
| 1315422 | 5/1973 | United Kingdom . |
| 1425876 | 2/1976 | United Kingdom . |
| 1446370 | 7/1976 | United Kingdom . |

OTHER PUBLICATIONS

UK Patent Application No. 2,032,575, Published May 8, 1980—Nissan Motor Company.

Primary Examiner—Robert R. Song
Assistant Examiner—Dennis Pedder
Attorney, Agent, or Firm—Thompson, Birch, Gauthier & Samuels

[57] ABSTRACT

In accordance with the present invention, there is provided an improved bumper construction for an automotive vehicle.

The vehicle has a plurality of bumper mounting stays and a body panel adjacent the stays.

The bumper construction comprises a thin-walled plastic bumper, a reinforcement member mounted to the bumper at an intermediate section thereof adjacent the body panel and a spring member interposed between the reinforcement member and the vehicle body panel. The reinforcement member and the intermediate section of the bumper are adapted to define a closed bumper configuration. The spring member is operatively connected to the reinforcement member and the vehicle body panel such that the intermediate section of the bumper is supported through the spring member by the body panel. The spring member is rigid in the vertical direction to resist vertical movement of the bumper relative to the vehicle body and is resiliently deformable in the horizontal direction to yieldingly resist the horizontal movement of the intermediate section of the bumper toward the vehicle body panel.

18 Claims, 16 Drawing Figures

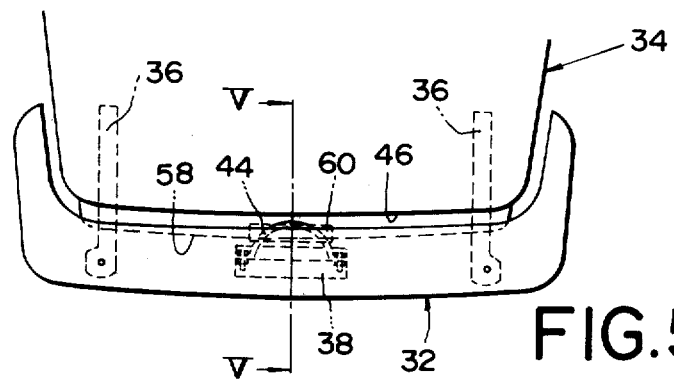
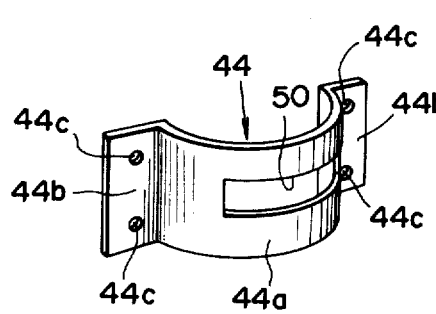
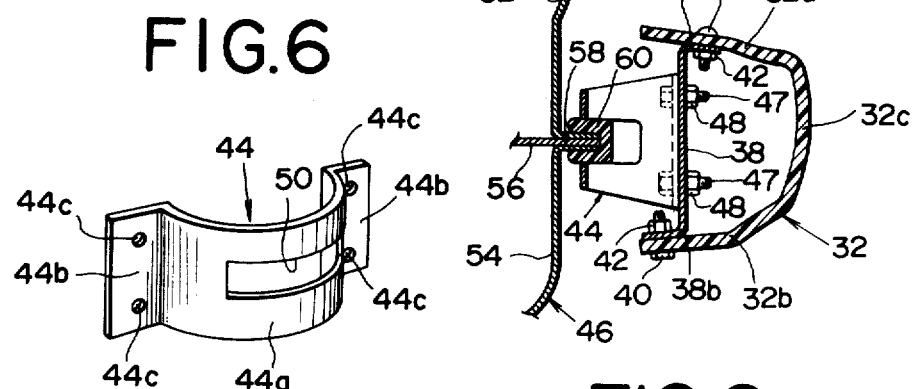
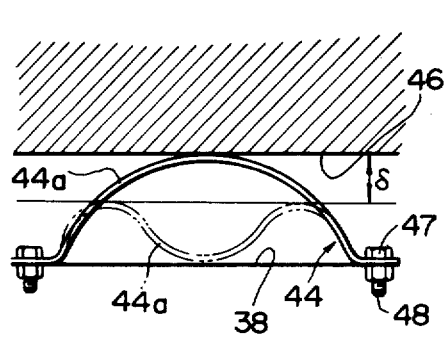
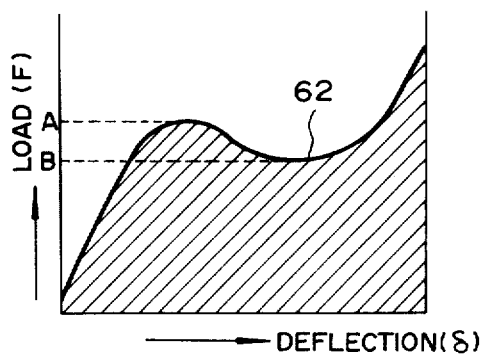

BUMPER CONSTRUCTION FOR AUTOMOTIVE VEHICLES

BACKGROUND OF THE INVENTION

1. Field of the Invention

The present invention relates in general to bumper constructions for automotive vehicles and more particularly to improvements in a bumper construction wherein the end sections of a plastic bumper are mounted to a vehicle body by means of a pair of bumper stays.

2. Description of the Prior Art

FIGS. 1 and 2 show a prior art rear bumper construction wherein a plastic bumper 10 is mounted at both end sections thereof to a vehicle body 12 by means of a pair of bumper stays 14. The bumper 10 is made of a plastic material such as polypropylene and has a C-shaped cross section as shown in FIG. 2. A reinforcement member 16 is made of metal and has a cross section similar to the bumper 10. The reinforcement member 16 is mounted to the inner surface of the bumper 10 and is secured thereto by means of bolts 18 and nuts 20. This reinforcement member 16 increases the rigidity of the bumper. In FIG. 2, the vehicle body 12 is shown to comprise, at the rear end thereof and adjacent the bumper 10, a body panel including a rear upper panel member 22, a rear lower panel member 24 and a rear floor panel member 26. The bumper stays 14, however, are mounted to the rear side members (not shown) of the vehicle body 12, respectively.

FIG. 3 sectionally shows a plastic rear bumper 28 used in another prior art rear bumper construction. This bumper 28 has sufficient structural rigidity even though it does not have a metallic reinforcement member as is used in the bumper construction of FIGS. 1 and 2. To provide this rigidity, the wall of the bumper 28 is formed sufficiently thick and in addition to this, a plurality of large spaced-apart ribs 30 are provided along the inner surface of the bumper 28.

The prior art bumper construction shown in FIGS. 1 and 2 has several disadvantages. It is relatively heavy due to the metallic reinforcement member 16. Also, if a permanent deformation of the reinforcement member 16 occurs, the bumper 10 is caused to have a distorted portion or portions even if the bumper itself is not substantially damaged.

The prior art bumper construction shown in FIG. 3 also has several disadvantages. The bumper 28 requires a large quantity of a plastic material and therefore requires a long moulding cycle. This causes high material and manufacturing costs. Furthermore, since the bumper 28 and the ribs 30 are not uniform in thickness and cool and shrink at different rates and amounts, the outer surface of the bumper 28 often undulates slightly. In order to overcome this surface defect and to improve the appearance of the bumper 28, it is necessary to process the outer surface of the bumper by graining. This inevitably results in further increasing the manufacturing cost of the bumper.

SUMMARY OF THE INVENTION

In accordance with the present invention, there is provided an improved bumper construction for an automotive vehicle.

The vehicle has a plurality of bumper mounting stays and a body panel adjacent the stays.

The bumper construction of this invention comprises a non-metallic bumper, a reinforcement member vertically spanning and mounted to the inner surface of the bumper, and a spring member mounted to the reinforcement member, the spring member adapted to be affixed to the vehicle body panel.

It is accordingly an object of the present invention to provide an improved bumper construction for an automotive vehicle which is excellent in various respects including weight, rigidity, material and manufacturing costs and shock-absorbing characteristics.

BRIEF DESCRIPTION OF THE DRAWINGS

The features and advantages of the bumper construction according to the present invention will become more clearly appreciated from the following description taken in conjunction with the accompanying drawings, in which:

FIG. 4 is a plan view of a bumper construction for an automotive vehicle according to an embodiment of the present invention;

FIG. 5 is a sectional view taken on line V—V of FIG. 4;

FIG. 6 is a perspective view of a spring member used in the bumper construction of FIG. 4;

FIG. 7 is a schematic plan view of the spring member of FIG. 4, with a phantom line showing the spring member when subjected to a relatively large load;

FIG. 8 is a load-deflection diagram of the spring member of FIG. 4;

DESCRIPTION OF THE PREFERRED EMBODIMENTS

Figure 1:
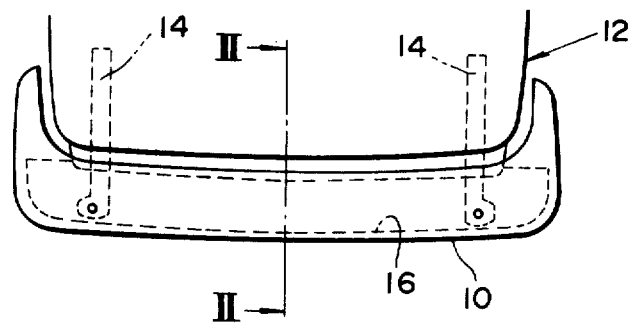
FIG. 1 is a plan view of a prior art rear bumper construction for an automotive vehicle.
Figure 2:
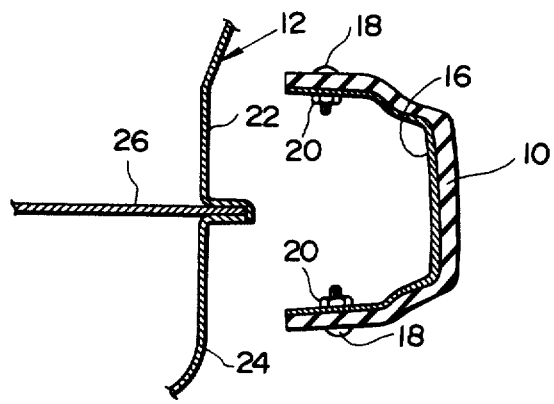
FIG. 2 is a sectional view taken on line II—II of FIG. 1.

Referring first to FIGS. 4 to 6, inclusive, a bumper construction for an automotive vehicle according to an embodiment of the present invention is shown to comprise a thin-walled rear bumper 32 which has a C-shaped cross section and which includes upper and lower wall sections 32a and 32b and a side wall 32c interconnecting the upper and lower wall sections. The bumper 32 is made of a non-metallic material or a plastic material such as polypropylene and is mounted at both end sections thereof to a vehicle body 34 in the conventional manner using a pair of bumper stays 36.

The bumper construction of the present invention further comprises a reinforcement member 38 which is mounted to the bumper 32 at an intermediate or longitudinal center point section thereof (meaning at a location approximately centered between the ends of the bumper). The reinforcement member 38 is in the form of a generally rectangular flat plate having upper and lower flange sections 38a and 38b. The upper and lower flange sections 38a and 38b of the reinforcement member 38 are respectively attached to the upper and lower wall sections 32a and 32b of the bumper 32 and are secured thereto by means of bolts 40 and nuts 42. In this manner, the substantially vertical reinforcement member 38 is spaced from the side wall section 32c of the bumper 32 and interconnects the upper and lower wall sections 32a and 32b. In other words, the reinforcement member 38 spans and closes the open end of the C-shaped cross section of the bumper 32 to define a closed bumper configuration (as viewed in cross section).

The bumper construction of the present invention further comprises a spring member 44 which is interposed between the reinforcement member 38 and a body panel 46 of the vehicle body 34, which body panel 46 is located adjacent the bumper stays 36 or located at the rear end of the vehicle body adjacent the intermediate section of the bumper 32. As shown in FIG. 6 in detail, the spring member 44 is a thin piece having a substantially semi-circular sectional portion 44a and a pair of flange portions 44b provided to the respective terminal ends of the semi-circular sectional portion. The spring member 44 is a single piece, preferably made of a plastic material such as polypropylene, but may be made of metal. The flange portions 44b of the spring member 44 are provided with a plurality of bolt accommodation openings 44c and, though not shown in the drawing, the reinforcement member 38 is also provided with a plurality of bolt accommodation openings which are to be registered with the openings 44c. The spring member 44 is attached at the flange portions 44b to the reinforcement member 38 and secured thereto by means of bolts 47 and nuts 48. The semi-circular sectional portion 44a of the spring member 44 is formed with an elongated opening 50 which longitudinally extends horizontally when the spring member is mounted to the reinforcement member.

As shown in FIG. 5, the body panel 46 includes a rear upper panel member 52, a rear lower panel member 54 and a rear floor panel member 56 which are joined together to form a reinforced flange 58 projecting into the opening 50 of the spring member 44. The flange 58 is in the form of a narrow horizontally extending strip as seen from FIG. 4. An elongated cushioning member 60 is bonded or otherwise secured to the flange 58 and is push-fitted into the opening 50 of the spring member 44. The cushioning member is made of a relatively soft resilient material such as rubber. The intermediate section of the bumper 32 is therefore supported through the spring member 44 by the body panel 46 which is sufficiently strong for the purposes of this invention.

In the bumper construction described above according to the present invention, the reinforcement member 38 is adapted to define, at the intermediate section of the bumper 32, a closed bumper configuration. In other words, reinforcement member 38 cooperates with the C-shaped bumper 32 such that a view in cross section through the longitudinal center point of the bumper shows a closed polygon (as seen clearly in FIG. 5). The reinforcement member 38 is relatively small and therefore lightweight as compared to the prior art reinforcement member but can effect a considerable increase in the rigidity of the bumper 32, particularly to the intermediate section thereof. The reinforcement member 38 is therefore quite efficient in increasing the rigidity of the bumper.

The intermediate section of the bumper 32 is made especially rigid against bending in the vertical direction since the intermediate section of the bumper is supported through the spring member 44 by the vehicle body panel 46. In addition, both end sections of the bumper are supported on the vehicle body 34 by means of the bumper stays 36. That is, the bumper is mounted at three points. In this instance, the spring member 44 is adapted to provide, due to the width thereof in the vertical direction, a predetermined rigidity against the bumper's bending in the vertical direction. In other words, the spring member 44 is rigid to resist the movement of the intermediate section of the bumper 32 in the upward and downward directions relative to the vehicle body.

The spring member 44, however, is resiliently deformable to yieldingly resist the movement of the intermediate section of the bumper 32 toward the vehicle body panel 46. That is, in the event of a rear end collision, the bumper 32 moves resiliently with the intermediate section thereof moving toward the body panel 46. The spring member 44 is confined between the reinforcement member 38 and the body panel 46 and deforms resiliently while resisting the movement of the bumper. The spring member 44 thus functions as a shock absorber in addition to the foregoing function as the rigid support. Furthermore, the spring member 44 has good shock-absorbing characteristics, since it is resiliently deformable over a wide range in response to widely varying impact loads applied thereto.

In FIG. 7, the solid line showing the spring member 44 represents the condition in which the forwardmost portion of the semi-circular sectional portion 44a of the spring member 44 is just brought into abutting engagement with the body panel 46. From this condition, the spring member 44 starts deforming resiliently. If the load applied to the spring member 44 is smaller than a certain value (A), the deformation of the spring member occurs in such a manner that the forwardmost portion of the semi-circular sectional portion 44a is kept engaged with the body panel 46. However, if the load applied to the spring member 44 is larger than the certain value (A), the semi-circular sectional portion 44a assumes a shape shown by the phantom line in FIG. 7. With the thus deformed portion 44a, the spring member 44 abuttingly engages the body panel 46 at two points. In this condition the load (B) is represented by the point 62 on the graph of FIG. 8. From this condition, the spring member 44 is still further deformable resiliently. In this manner, the spring member 44 is resiliently deformable over a wide range in response to widely varying impact loads applied thereto and is accordingly quite effective in improving the shock-absorbing characteristics of the bumper construction.

FIG. 8 is the load-deflection diagram of the spring member 44 showing the relation between a given load (F) and the corresponding deflection ($\delta$) of the spring member. In this diagram, the concave portion 62 on the curve represents the condition in which the semicircular sectional portion 44a of the spring member 44 is deformed into the shape as shown by the phantom line in FIG. 7.

Figure 9:
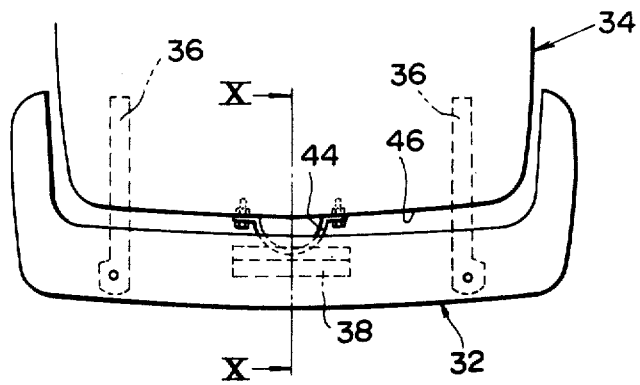
FIG. 9 is a plan view of a bumper construction for an automotive vehicle according to another embodiment of the present invention.
Figure 10:
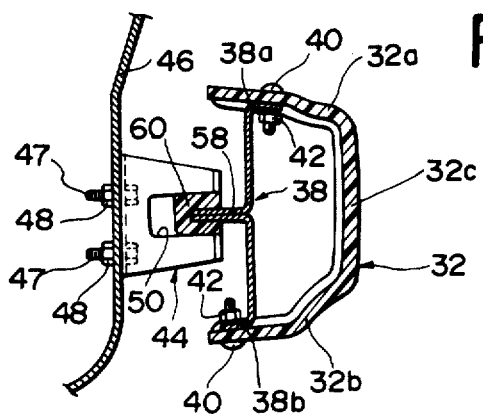
FIG. 10 is a sectional view taken on line X—X of FIG. 9.

FIGS. 9 and 10 show another embodiment of the present invention. In FIGS. 9 and 10, like reference numerals to the previous embodiment are employed to designate like elements. This embodiment is suited for use on the front end of a vehicle body 34 or on a body panel which has no flange 58 as in the previous embodiment.

In this embodiment, a reinforcement member 38 is mounted to a front bumper 32 at the intermediate section thereof in a manner similar to the previous embodiment, but is formed of separate upper and lower halves which have joining ends cooperating to form a flange 58. The spring member 44 is secured to a body panel 46 by means of bolts and nuts and is formed with an elongated opening 50 into which the flange 58 projects. A cushioning member 60 joins the flange 58 and the spring member 44 together in a manner similar to the previous embodiment. This embodiment produces substantially the same effect as the previous embodiment.

Figure 3:
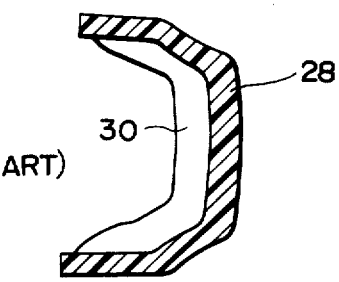
FIG. 3 is a sectional view of a bumper used in another prior art rear bumper construction for an automotive vehicle.
Figure 11:
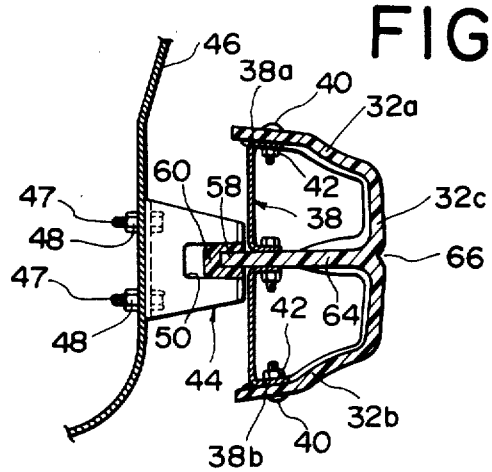
FIG. 11 is a sectional view of a bumper construction for an automotive vehicle according to a further embodiment of the present invention.

FIG. 11 shows a further embodiment of the present invention. In FIG. 11, like reference numerals to the previous embodiments are employed to designate like elements. This embodiment differs from the previous embodiments in that a bumper 32 has an internal rib 64 which is adapted to form at the free end thereof a flange 58 projecting into an opening 50 formed in the spring member 44. The inner ends of the upper and lower halves of a reinforcement member 38 are secured to rib 64 by means of a bolt and nut as shown. The moulding of integral rib 64 creates a surface defect in bumper 32 for the same reason as the surface defect is created in prior art bumper 28 of FIG. 3. The rib 64, however, is arranged to extend longitudinally along the bumper 32 and is centered between the upper and lower wall sections 32a and 32b of the bumper. It is, therefore, possible to remove the surface defect by forming an ornamental groove 66 on the outer surface of the bumper 32, which groove 66 extends longitudinally along the bumper. The groove 66 is formed during moulding of the bumper. In addition to forming such groove 66 on the outer surface of the bumper 32, a garnish or the like may be attached into the groove to further improve the appearance of the bumper. The embodiment of FIG. 11 functions approximately the same as the previous embodiments.

Figure 12:
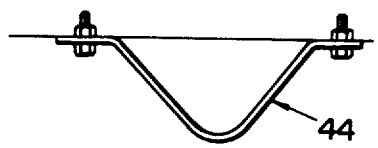
FIGS. 12 to 16 are schematic plan views of other spring members which can be used in the bumper construction of the present invention.
Figure 13:
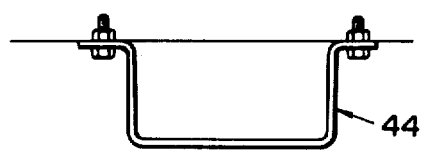
Figure 14:
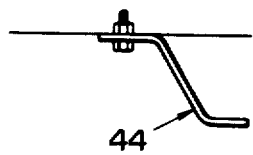
Figure 15:
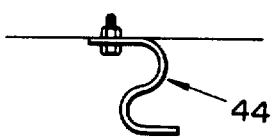
Figure 16:
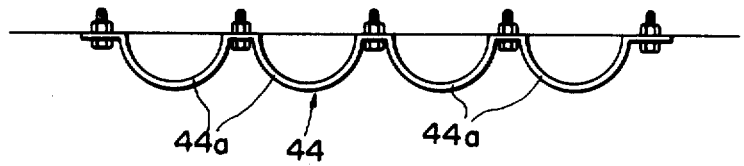

In the foregoing embodiments, while the spring member 44 is specifically described and shown, it is not necessarily limited to that specific shape and may alternatively have various shapes. That is, as shown in FIG. 12, the spring member 44 may alternatively be a thin piece having a V-like sectional portion and a pair of flange portions provided to the respective terminal ends of the V-like sectional portion. Furthermore, as shown in FIG. 13, the spring member 44 may alternatively be a thin piece having a U-like sectional portion and a pair of flange portions provided to the terminal ends of the U-like sectional portion. Still furthermore, as shown in FIGS. 14 and 15, the spring member 44 may alternatively be a thin piece shaped and arranged in the manner of a cantilever. Yet furthermore, as shown in FIG. 16, the spring member 44 may alternatively be a thin piece having a plurality of semi-circular sectional portions and a plurality of flange portions provided to each terminal end of the semi-circular sectional portions.

Obviously, many variations and modifications of the present invention are possible in light of the above teachings. It is, therefore, to be understood that within the scope of the appended claims, the invention may be practiced otherwise than as specifically described.

What is claimed is:

1. A bumper construction for an automotive vehicle which has a pair of spaced-apart bumper mounting stays fixed to the vehicle body, the bumper construction comprising:

a resilient, non-metallic bumper extending across an end of the vehicle, said bumper being mounted to the bumper mounting stays, said bumper having a C-shaped cross section including upper and lower bumper wall sections;

a reinforcement member mounted on said bumper at the approximate longitudinal center point section of said bumper between said bumper mounting stays, said reinforcement member interconnecting said upper and lower wall sections of said bumper thereby forming an approximate rectangle when viewed in cross section; and a spring member interposed between and operably connecting said reinforcement member and the vehicle body such that said longitudinal center point section of said bumper is mounted to the vehicle body, said spring member resiliently deforming and yieldingly resisting horizontal movement of said longitudinal center point section of said bumper towards the vehicle body, said spring member remaining substantially rigid and unyieldingly preventing substantial vertical movement of said longitudinal center point section of said bumper.

2. A bumper construction for an automotive vehicle which has a pair of spaced-apart bumper mounting stays fixed to the vehicle body, the bumper construction comprising:

a resilient, non-metallic bumper extending across an end of the vehicle, said bumper being mounted to the bumper mounting stays, said bumper having a C-shaped cross section including upper and lower bumper wall sections;

a reinforcement member mounted on said bumper at the approximate longitudinal center point section of said bumper between said bumper mounted stays, said reinforcement member interconnecting said upper and lower wall sections of said bumper thereby forming an approximate rectangle when viewed in cross section; and a spring member interposed between and operably connecting said reinforcement member and the vehicle body such that said longitudinal center point section of said bumper is mounted to the vehicle body, said spring member resiliently deforming and yieldingly resisting horizontal movment of said longitudinal center point section of said bumper towards the vehicle body, said spring member remaining substantially rigid and unyieldingly preventing substantial vertical movement of said longitudinal center point section of said bumper, said spring member also having push-fit joining means provided thereon for engagement with one of said reinforcement member and the vehicle body.

3. A bumper construction as set forth in claim 2, wherein said spring member is fixedly attached to said reinforcement member, said push-fit joining means engaging said spring member to the vehicle body.

4. A bumper construction as set forth in claim 3, wherein said push-fit joining means comprises an opening formed in said spring member, a flange provided on the vehicle body and projecting into said opening of said spring member, and a cushioning member fixedly attached to said flange of the vehicle body and push-fitted into said opening of said spring member.

5. A bumper construction as set forth in claim 4, wherein said opening of said spring member is elongated horizontally, and said flanage and said cushioning member are also elongated horizontally.

6. A bumper construction as set forth in claim 5, wherein said cushioning member is made of rubber.

7. A bumper construction as set forth in claim 2, wherein said spring member is made of a plastic material.

8. A bumper construction as set forth in claim 2, wherein said spring member is made of metal.

9. A bumper construction as set forth in claim 2, wherein said spring member is fixedly attached to the vehicle body, said push-fit joining means engaging said spring member to said reinforcement member.

10. A bumper construction as set forth in claim 9 wherein said push-fit joining means comprises an opening formed in said spring member, a flange provided to said reinforcement member and projecting into said opening of said spring member, and a cushioning member fixedly attached to said flange and push-fitted into said opening of said spring member.

11. A bumper construction as set forth in claim 10, wherein said reinforcement member comprises two separate upper and lower halves having joining ends cooperating to form said flange.

12. A bumper construction as set forth in claim 10, wherein said bumper has an integral rib which forms at a free end thereof said flange, and wherein said reinforcement member has two separate upper and lower halves which are attached at their facing ends to said rib.

13. A bumper construction as set forth in claim 10, wherein said cushioning member is made of rubber.

14. A bumper construction as set forth in claim 2, wherein said spring member is a thin piece having a substantially semi-circular sectional portion and a pair of flange portions provided to the respective terminal ends of said semi-circular portion.

15. A bumper construction as set forth in claim 2, wherein said spring member is a thin piece having a V-like sectional portion and a pair of flange portions provided to the respective terminal ends of said V-like sectional portion.

16. A bumper construction as set forth in claim 2, wherein said spring member is a thin piece having a U-like sectional portion and a pair of flange portions provided to the terminal ends of said U-like sectional portion.

17. A bumper construction as set forth in claim 2, wherein said spring member is a thin piece having a plurality of semi-circular sectional portions and a plurality of flange portions provided to each terminal end of said semi-circular sectional portions.

18. A bumper construction as set forth in claim 2, wherein said spring member is a thin piece shaped and arranged in the manner of a cantilever spring.

* * * * *